July 14, 1959 B. A. HARRIS 2,895,124
MAGNETIC CORE DATA STORAGE AND READOUT DEVICE
Filed May 8, 1957
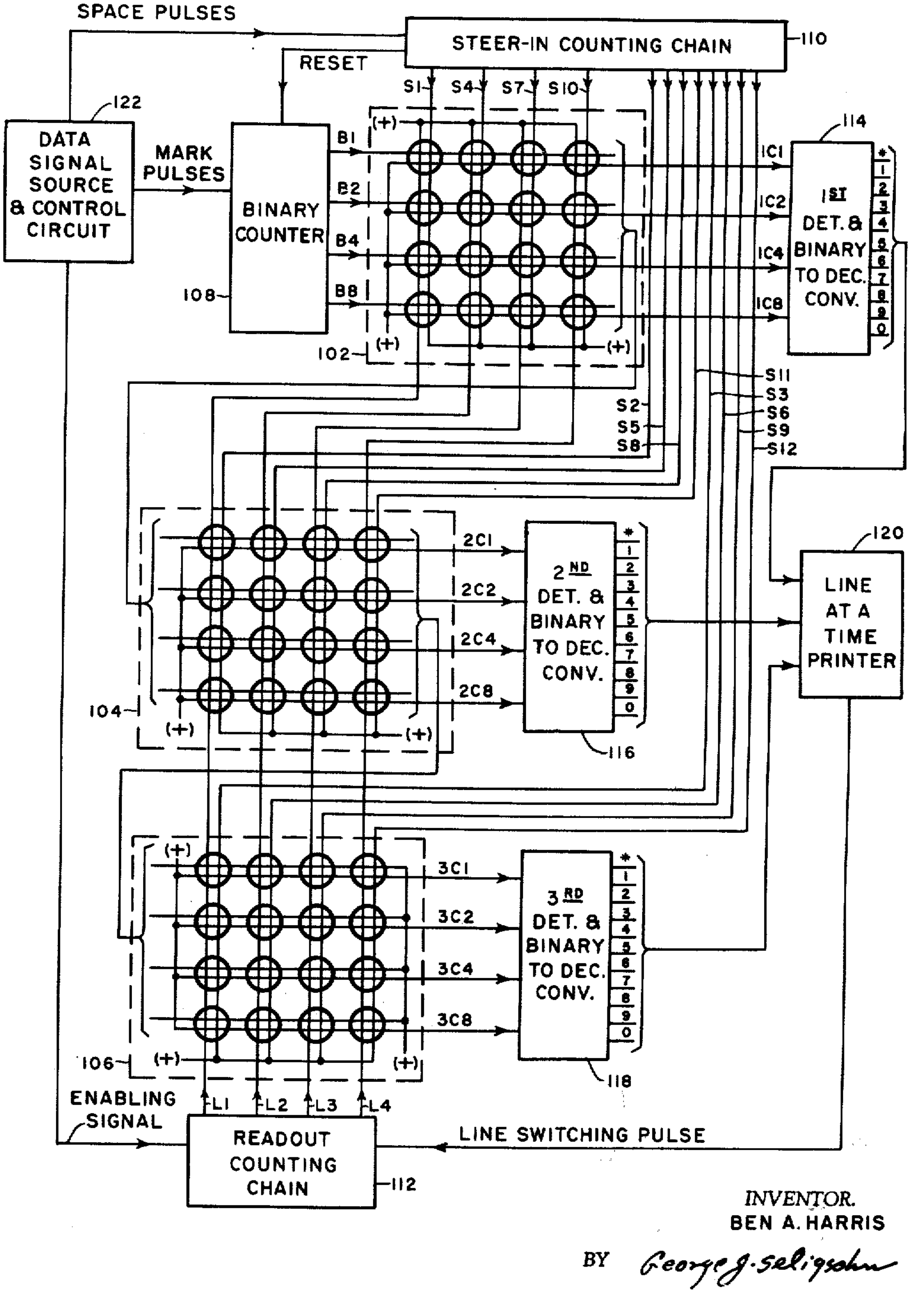
INVENTOR.
BEN A. HARRIS
BY George J. Seligsohn
ATTORNEY 2,895,124
Patented July 14, 1959

2,895,124

MAGNETIC CORE DATA STORAGE AND READOUT DEVICE

Ben A. Harris, Rochester, N.Y., assignor to General Dynamics Corporation, Rochester, N.Y., a corporation of Delaware Application May 8, 1957, Serial No. 657,896

11 Claims. (Cl. 340—174)

This invention relates to a magnetic core data storage and readout device and, more particularly, to such a device for sequentially storing individual characters of data a character at a time, while reading out the stored data a line at a time.

Line-at-a-time indicating means, such as a printer, are well known in the art, a conventional adding machine being a good example thereof. It is often desired to utilize such line-at-a-time indicating means, rather than character-at-a-time indicating means, such as a typewriter, as the final output device of a data processing system, because the former is capable of operating at significantly higher speed.

Usually, the original data source supplies pieces of data sequentially a character at a time. Furthermore, it is often necessary to first read an entire set of data before it can be determined whether or not the data is to be printed, or otherwise indicated, by the final output device. For both these reasons, it is necessary to provide an intermediate data storage means in which the pieces of data from the original data source may be sequentially stored a character at a time, and thereafter read out to the final output device a line at a time.

Briefly, this invention contemplates a plurality of two-dimensional matrices of magnetic cores, the cores of each matrix being arranged in rows and columns. A first set of conductors has each respective conductor thereof in cooperative relationship with the cores of separate but corresponding rows of each of the matrices. A second set of conductors has the respective conductors thereof in cooperative relationship with the cores of separate columns of separate ones of the matrices. A third set of conductors has the respective conductors thereof in cooperative relationship with the cores of separate but corresponding columns of each of the matrices. A fourth set of conductors has the respective conductors thereof in cooperative relationship with the cores of separate rows of separate ones of the matrices. In addition, data input means for sequentially applying pieces of data a character at a time are connected to the first and second sets of conductors, and readout means for reading out a line at a time are connected to the third and fourth sets of conductors. The manner in which the data input means and the readout means cooperate with the matrices of magnetic cores will be described in detail below.

It is therefore an object of this invention to provide an improved data storage and readout device.

It is another object of this invention to provide an improved data storage and readout device utilizing magnetic cores.

It is a further object of this invention to provide a data storage and readout device utilizing magnetic cores in which data may be sequentially stored a character at a time and read out a line at a time.

These and other objects and features of the invention will become apparent from the following detailed description of a preferred embodiment of the invention taken together with the accompanying drawing, in which:

The sole figure is a schematic and block diagram of the preferred embodiment of the invention.

Referring now to the drawing, there is shown three two-dimensional matrices of magnetic cores, 102, 104 and 106, respectively. Each of matrices 102, 104 and 106 is made up of sixteen magnetic cores arranged in four rows and four columns, as shown. Initially, each of the magnetic cores of the three matrices 102, 104 and 106, respectively, have a given magnetic polarization.

In cooperative relationship with each of the magnetic cores is a first set of conductors B1, B2, B4 and B8, respectively. More specifically, conductor B1 passes serially in the same direction through the magnetic cores of the top row of matrix 102, the magnetic cores of the top row of matrix 104, and the magnetic cores of the top row of matrix 106, as shown. In a similar manner, conductor B2 passes through the magnetic cores of the respective second from the top rows of matrices 102, 104 and 106; conductor B4 passes through the magnetic cores of the respective third from the top rows of matrices 102, 104 and 106; and conductor B8 passes through the respective fourth from the top rows of matrices 102, 104 and 106.

In cooperative relationship with each column of each separate one of matrices 102, 104 and 106 is a second set of conductors, S1–S12, inclusive. More specifically, conductor S1 passes solely through the magnetic cores of the left-hand column of matrix 102, conductor S2 passes solely through the magnetic cores of the left-hand column of matrix 104, conductor S3 passes solely through the magnetic cores of the left-hand column of matrix 106, conductor S4 passes solely through the magnetic cores of the second from the left column of matrix 102, conductor S5 passes solely through the magnetic cores of the second from the left column of matrix 104, conductor S6 passes solely through the magnetic cores of the second from the left column of matrix 106, conductor S7 passes solely through the magnetic cores of the third from the left column of matrix 102, conductor S8 passes solely through the magnetic cores of the third from the left column of matrix 104, conductor S9 passes solely through the magnetic cores of the third from the left column of matrix 106, conductor S10 passes solely through the magnetic cores of the fourth from the left column of matrix 102, conductor S11 passes solely through the magnetic cores of the fourth from the left column of matrix 104, and conductor S12 passes solely through the magnetic cores of the fourth from the left column of matrix 106.

In addition to the first and second sets of conductors, just described, the magnetic cores of matrices 102, 104 and 106 are also in cooperative relationship with a third set of conductors, L1–L4, inclusive, and a fourth set of conductors, 1C1, 1C2, 1C4, 1C8, 2C1, 2C2, 2C4, 2C8, 3C1, 3C2, 3C4, and 3C8. More specifically, conductor L1 passes through the magnetic cores of the left-hand columns of each of matrices 102, 104 and 106; conductor L2 passes through the magnetic cores of the second from the left columns of each of matrices 102, 104 and 106; conductor L3 passes through the magnetic cores of the third from the left columns of each of matrices 102, 104 and 106; and conductor L4 passes through the magnetic cores of the fourth from the left columns of each of matrices 102, 104 and 106. Conductor 1C1 passes solely through the magnetic cores of the top row of matrix 102, conductor 1C2 passes solely through the magnetic cores of the second from the top row of matrix 102, conductor 1C4 passes solely through the magnetic cores of the third from the top row of matrix 102, and conductor 1C8 passes solely through the magnetic cores of the fourth from the top row of matrix 102. In a similar manner, conductors 2C1, 2C2, 2C4, and 2C8 pass solely through the magnetic cores of the respective rows of matrix 104, and conductors 3C1, 3C2, 3C4 and 3C8 pass solely through the respective rows of matrix 106.

The first set of conductors B1, B2, B4 and B8 have one end thereof connected to respective outputs of binary counter 108 and the other ends thereof connected to a point of reference potential. Binary counter 108 may consist of a plurality of interconnected flip-flop circuits for producing a binary output manifesting the number of pulses in a series of pulses applied as an input thereto.

The second set of conductors S1–S12, inclusive, have one end thereof connected to respective outputs of steer-in counting chain 110 and the other end thereof connected to a point of reference potential. Steer-in counting chain 110 may consist of a chain of interconnected cold-cathode triodes, in which only one triode is conducting at any given time, and in which the conducting triode is sequentially stepped along the chain in response to each of a plurality of pulses applied as an input thereto.

The third set of conductors L1–L4, inclusive, have one end thereof connected to respective outputs of readout counting chain 112, which is normally disabled, and the other end thereof connected to a point of reference potential. Readout counting chain 112 may consist of a chain of interconnected cold-cathode triodes similar to steer-in counting chain 110.

Conductors 1C1, 1C2, 1C4 and 1C8 of the fourth set of conductors have one end thereof connected as respective inputs to first detector and binary-to-decimal converter 114 and the other end thereof connected to a point of reference potential. In a similar manner, conductors 2C1, 2C2, 2C4 and 2C8 of the fourth set of conductors are connected as respective inputs to second detector and binary-to-decimal converter 116 and conductors 3C1, 3C2, 3C4 and 3C8 of the fourth set of conductors are connected as respective inputs to the third detector and binary-to-decimal converter 118. First, second and third detector and binary-to-decimal converters 114, 116 and 118 are of similar construction, and may consist of respective biased detectors connected to each of the fourth set of conductors for permitting the passage of a potential on the respective conductors which has a given polarity and at least a given amplitude; and, in addition, consist of means, such as a relay tree, for converting binary information into decimal information.

The decimal outputs of first, second and third detector and binary-to-decimal converters 114, 116 and 118 are applied as respective inputs to a line-at-a-time indicating means, such as line-at-a-time printer 120. Line-at-a-time printer 120 is similar to a conventional adding machine, which prints a line at a time, except that it includes solenoid-operated means, rather than manual means, for supplying data thereto.

The original data comes from data signal source and control circuit 122. Data signal source and control circuit 122 may, by way of example, be the playback and readout control circuit of the automatic toll ticketing system disclosed in patent application Serial No. 536,573, entitled "Automatic Subscriber Identification System," by Morris and Clement, filed September 26, 1955, and assigned to the same assignee as the present invention. In this system, the data, which is originally recorded on a two-channel magnetic tape, consists of a plurality of series of "mark" pulses, manifesting the respective values of various pieces of data, recorded on a first channel of the magnetic tape, and a series of "space" pulses, each of which occurs immediately after a series of "mark" pulses, recorded on a second channel of the magnetic tape. The "space" pulses are utilized to separate successively recorded pieces of data from each other. Furthermore, the end of a given set of data is manifested by the coincident occurrence of a "mark" pulse and a "space" pulse.

In any case, data signal source and control circuit 122 sequentially supplies as a first output thereof a plurality of series of "mark" pulses and as a second output thereof a series of "space" pulses, each of which occurs immediately after each series of "mark" pulses. The "mark" pulses are applied, as shown, as an input to binary counter 108, and the "space" pulses are applied as an input to steer-in counting chain 110, as shown.

A reset signal is applied from steer-in counting chain 110 to binary counter 108 immediately subsequent to the stepping of steer-in counting chain 110 in response to a "space" pulse applied thereto. This reset signal may be obtained by connecting the plurality of outputs of steer-in counting chain 110 to a terminal through individual "or" gates and coupling this terminal to binary counter 108 through a differentiating circuit. In this manner, immediately subsequent to the stepping of steer-in counting chain 110 by a "space" pulse applied thereto a differentiated pulse will be applied as a reset signal to binary counter 108.

Normally disabled readout counting chain 112 may be rendered operative by an enabling signal applied thereto from data signal source and control circuit 122, as shown. This enabling signal may be obtained in response to the above-described coincidence of a "mark" pulse and "space" pulse, manifesting the end of a given set of data. If such means for obtaining an enabling signal are not included in data signal source and control circuit 122, readout counting chain 112 may be supplied with a self-contained switch which may be manually operated to render it enabled. Line-at-a-time printer 120 includes cam operated contacts which are momentarily closed each time line-at-a-time printer 120 is operated, to thereby produce a line switching pulse. This line switching pulse is produced immediately subsequent to the printing of a line by line-at-a-time printer 120, and is applied as shown as an input to readout counting chain 112 to effect the stepping thereof.

The operation of the preferred embodiment of this invention shown in the drawing will now be described.

Each of the series of "mark" pulses applied to binary counter 108 from data signal source and control circuit 122 may contain anywhere from one to ten pulses. In response to the first pulse of a series an output current is applied through conductor B1 of the first set of conductors; in response to two pulses a current is applied through conductor B2; in response to three pulses a current is applied through both conductors B1 and B2; in response to four pulses a current is applied through conductor B4; in response to five pulses a current is applied through both conductors B4 and B1; in response to six pulses a current is applied through both conductors B4 and B2; in response to seven pulses a current is applied through each of conductors B4, B2 and B1; in response to eight pulses a current is applied through conductor B8; in response to nine pulses a current is applied through conductors B8 and B1; and in response to ten pulses a current is applied through conductors B8 and B2. These currents are all in a direction to produce a magnetic field which tends to cause the magnetic cores in cooperation therewith to switch from their initial given polarization to a polarization opposite thereto. However, the intensity of each of these currents is per se insufficient to produce a magnetic field of sufficient magnitude to effect the switching of these magnetic cores.

Immediately after the first series of "mark" pulses has been applied to binary counter 108, the first "space" pulse is applied to steer-in counting chain 110, causing a current to be applied through conductor S1 of the second set of conductors. The current through conductor S1 per se is also of a direction and intensity which tends but is insufficient to cause the magnetic cores in cooperation therewith, i.e. the cores of the left-hand column of matrix 102, to switch to a magnetic polarization opposite to the given initial magnetic polarization. However, the total magnetization produced in those selected magnetic cores of the left-hand column of matrix 102 which are in cooperative relationship with the particular ones of conductors B1, B2, B4 and B8 which in binary notation manifest, by having a current therethrough, the number of pulses in the first series of "mark" pulses, is sufficient to cause the switching of the selected magnetic cores, thereby storing the value of the number of pulses in the first series of "mark" pulses in these selected ones of the magnetic cores of the left-hand column of matrix 102. Immediately thereafter, a reset signal is applied from steer-in counting chain 110 to binary counter 108 to effect the resetting thereof.

In a similar manner the number of pulses in the second series of "mark" pulses is stored in the left-hand column of matrix 104 and the number of pulses in the third series of "mark" pulses is stored in the left-hand column of matrix 106; while the number of pulses in the fourth, fifth and sixth series of "mark" pulses is stored in the second from the left columns of matrices 102, 104 and 106, respectively, the number of pulses in the seventh, eighth and ninth series of "mark" pulses is stored in the third from the left columns of matrices 102, 104 and 106, respectively, and the number of pulses in the tenth, eleventh and twelfth series of "mark" pulses is stored in the fourth from the left columns of matrices 102, 104 and 106, respectively.

After all the data has been stored in the magnetic core matrices, the enabling signal, described above, is applied to readout counting chain 112, causing a current to be applied through conductor L1. This current is of a direction and intensity sufficient to produce a magnetic field which causes those magnetic cores in the left-hand columns of matrices 102, 104 and 106 which have been switched to a magnetic polarization opposite to the initial given magnetic polarization, to be switched back to the initial given magnetic polarization. This causes a potential of a given polarity and at least a given amplitude to be induced in only those ones of the fourth set of conductors which are in cooperative relationship with the magnetic cores which have been switched back. This potential is applied through the respective detectors and binary-to-decimal converters of elements 114, 116 and 118 and applied to line-at-a-time printer 120. There they cause the operation of printer 120 by energizing the solenoids thereof in response thereto, so that line-at-a-time printer 120 simultaneously prints as first, second and third characters, respectively, of a first line the pieces of data stored in the left-hand columns of matrices 102, 104 and 106, respectively. Immediately thereafter, a line switching pulse is applied from line-at-a-time printer 120 to readout counting chain 112, causing the current through conductor L1 to be removed and to be applied through conductor L2. This results in the readout of the pieces of data stored in the second from the left columns of matrices 102, 104 and 106, respectively, to thereby effect the simultaneous printing of these pieces of data as the first, second and third characters, respectively, of the second line by line-at-a-time printer 120. In a similar manner, the third and fourth lines are read out by readout counting chain 112 and printed a line at a time by line-at-a-time printer 120.

It is apparent that the number of characters in a line may be increased by increasing the number of matrices, and that the number of lines may be increased by increasing the number of columns in each matrix. Furthermore, by supplying sufficient rows of magnetic cores in each matrix, decimal information may be directly stored therein, or any other information code, such as two out of five, etc. may be used in storing data.

Although only a preferred embodiment of this invention has been described in detail, it is not intended to limit the invention thereto, but to include all modifications which fall within the spirit and scope of the following appended claims.

I claim:

1. A data storage and readout device for sequentially storing individual characters of data a character at a time and thereafter reading out the stored data a line at a time, said device comprising a plurality of two-dimensional matrices of magnetic cores, the cores of each of said matrices being arranged in rows and columns, a first set of conductors each of which is in cooperative relationship with the cores of separate but corresponding rows of each of said matrices, a second set of conductors each of which is in cooperative relationship with the cores of separate columns of separate ones of said matrices, a third set of conductors each of which is in cooperative relationship with the cores of separate but corresponding columns of each of said matrices, and a fourth set of conductors each of which is in cooperative relationship with the cores of separate rows of separate ones of said matrices.

2. The device defined in claim 1, wherein each of said cores initially has a given magnetic polarization, and further comprising first means for storing data in said cores, said first means including second means for applying a first current through at least one of said first set of conductors and third means for selectively applying a second current through a particular one of said second set of conductors, each of said first and second currents per se having a direction and intensity to produce a magnetic field tending but insufficient to cause said cores in cooperative relationship therewith to switch from said given magnetic polarization to a polarization opposite to said given polarization, but which produce a combined magnetic field sufficient to cause said cores in cooperative relationship with both said first and second currents to switch from said given magnetic polarization to a polarization opposite to said given polarization.

3. The device defined in claim 2, wherein said first means further includes fourth means coupled to said second and third means for sequentially controlling the application of said first current through various respective combinations of said first set of conductors in accordance with the character of each of a plurality of successive pieces of data to be stored in said cores, and for simultaneously controlling the application of said second current through a different one of said second set of conductors in accordance with each of said successive pieces of data.

4. The device defined in claim 3, further comprising fifth means for reading out the data stored in said cores, said fifth means including sixth means for applying a third current through a particular one of said third set of conductors, said third current having a direction and intensity sufficient to produce a magnetic field to cause said particular cores in cooperative relationship therewith which have a polarization opposite to said given polarization to switch back to said given polarization, to thereby induce in those ones of said fourth set of conductors which are in cooperative relationship with said particular cores a potential having a given polarity and at least a given amplitude.

5. The device defined in claim 4, wherein said fifth means includes seventh means coupled to said sixth means for controlling the sequential application of said third current through each of said third set of conductors.

6. The device defined in claim 5, wherein said fifth means further includes detector means coupled to each one of said fourth set of conductors for producing an output therefrom only in response to a potential having said given polarity and at least said given amplitude being applied thereto.

7. The device defined in claim 6, wherein said fifth means further includes indicating means coupled to said detector means and responsive to the output therefrom for simultaneously providing an indication of a plurality of pieces of data.

8. A data processing system comprising a data signal source for sequentially providing a plurality of first series of pulses as a first output thereof, each of said first series manifesting a quantum of data, and for providing a second series of pulses as a second output thereof, each pulse of said second series occurring immediately after each first series of pulses, a binary counter having a plurality of outputs, means for applying said first output of said data signal source as an input to said binary counter, a first counting chain having a plurality of outputs, means for applying said second output of said data signal source as an input to said first counting chain, a plurality of two-dimensional matrices of magnetic cores, the cores of each of said matrices being arranged in rows and columns and each of said cores initially having a given magnetic polarization, a first set of conductors each of which is in cooperative relationship with the cores of separate but corresponding rows of each of said matrices, a second set of conductors each of which is in cooperative relationship with the cores of separate columns of separate ones of said matrices, a third set of conductors each of which is in cooperative relationship with the cores of separate but corresponding columns of each of said matrices, a fourth set of conductors each of which is in cooperative relationship with the cores of separate rows of separate ones of said matrices, means for applying the respective outputs of said binary counter individually to each one of said first set of conductors to provide in accordance with the count registered by said binary counter a first current in selected ones of said first set of conductors, means for applying the respective outputs of said first counting chain to said second set of conductors to provide in accordance with the count registered in said first counting chain a second current in a selected one of said second set of conductors, each of said first and second currents per se having a direction and intensity to produce a magnetic field tending but insufficient to cause said cores in cooperative relationship therewith to switch from said given magnetic polarization to a polarization opposite to said given polarization, but which produce a combined magnetic field sufficient to cause said cores in cooperative relationship with both said first and second currents to switch from said given magnetic polarization to a polarization opposite to said given polarization, means coupling said first counting chain to said binary counter to effect the reset of said binary counter immediately subsequent to said first counting chain registering a count in response to a pulse of said second series being applied thereto, and readout means including a normally disabled second counting chain having a plurality of outputs, means for applying said respective outputs of said second counting chain individually to each one of said third set of conductors, means for enabling said second counting chain for providing a third current as a particular one of said plurality of outputs of said second counting chain, said third current having a direction and intensity sufficient to produce a magnetic field to cause said particular cores in cooperative relationship therewith which have a polarization opposite to said given polarization to switch back to said given polarization, to thereby induce in those ones of said fourth set of conductors which are in cooperative relationship with said particular cores a potential having a given polarity and at least a given amplitude, a line-at-a-time indicating means, a plurality of means each of which includes detector means for producing an output therefrom only in response to a potential having said given polarity and greater than said given amplitude being applied as an input thereto, means for coupling each of said fourth set of conductors individual to a respective one of said matrices as an input to a separate one of said detector means, means for applying the respective outputs of said detector means as inputs to said indicating means to effect the operation thereof, and means coupling said indicating means to said second counting means for applying a pulse to said second counting means in response to an operation of said indicating means to remove said third current from said particular one of said plurality of outputs of said second counting chain and apply said third current to the next successive one of said plurality of outputs of said second counting chain.

9. The system defined in claim 8, wherein said means for enabling said second counting chain is coupled to said data signal source for enabling said second counting chain immediately subsequent to the completion of the providing of the last pulse of said second series.

10. A data storage and readout device comprising magnetic core storage means, first means coupled to said magnetic core storage means for sequentially storing a plurality of characters of data in said magnetic core storage means an individual character at a time, and second means coupled to said magnetic core storage means for reading out the stored data a line at a time, wherein a line includes a plurality of individual characters.

11. The device defined in claim 10, wherein said magnetic core storage means includes a plurality of groups of magnetic cores, wherein said first means includes third means for sequentially changing the magnetic polarization of a unique combination of the cores of each of said groups in accordance with the valve of each of successive characters, and wherein said second means includes fourth means simultaneously responsive to the changed magnetic polarization of cores of several of said groups to simultaneously produce an output from each of said several groups.

References Cited in the file of this patent

UNITED STATES PATENTS

| | | |
|---|---|---|
| 2,691,155 | Rosenberg et al. | Oct. 5, 1954 |
| 2,736,880 | Forrester | Feb. 28, 1956 |
| 2,802,203 | Stuart-Williams | Aug. 6, 1957 |

OTHER REFERENCES

Publication: Edvac Progress Report #2, June 30, 1946, pp. 4-22, 4-23, Py-0-164, Py-0-165.